US006680919B1

United States Patent
Rauhala

(10) Patent No.: US 6,680,919 B1
(45) Date of Patent: Jan. 20, 2004

(54) DOWNLOADING OF MAPS AND LOCATION SPECIFIC CONFIGURATION INFORMATION TO GPS-CAPABLE MOBILE COMMUNICATION TERMINAL

(75) Inventor: Kristian Rauhala, San Diego, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/498,210

(22) Filed: Feb. 4, 2000

(51) Int. Cl.[7] ................................................. H04Q 7/22
(52) U.S. Cl. ........................................ 370/310; 342/358
(58) Field of Search .......................... 701/213; 342/457, 342/357.13, 357.12, 358; 370/310, 310.2; 434/112

(56) References Cited

U.S. PATENT DOCUMENTS

| | | | |
|---|---|---|---|
| 5,418,537 A | 5/1995 | Bird | 342/357 |
| 5,470,233 A | * 11/1995 | Fruchterman et al. | 434/112 |
| 5,479,479 A | 12/1995 | Braitberg et al. | 379/58 |
| 5,786,789 A | 7/1998 | Janky | 342/357 |
| 5,847,679 A | 12/1998 | Yee et al. | 342/357 |
| 5,920,283 A | * 7/1999 | Shaheen et al. | 342/357.12 |
| 5,959,577 A | * 9/1999 | Fan et al. | 342/357.13 |
| 5,991,690 A | * 11/1999 | Murphy | 342/457 |
| 6,121,922 A | 9/2000 | Mohan | 342/357.1 |
| 6,128,501 A | * 10/2000 | Ffoulkes-Jones | 342/358 |
| 6,144,336 A | 11/2000 | Preston et al. | 342/357.09 |
| 6,336,074 B1 | * 1/2002 | Woo | 342/357.13 |

FOREIGN PATENT DOCUMENTS

| | | | |
|---|---|---|---|
| EP | 0875878 | 11/1998 | G08G/1/0968 |
| GB | 2313257 | 11/1997 | H04Q/7/38 |
| WO | 9808314 | 2/1998 | H04B/7/185 |
| WO | 9909374 | 2/1999 | G01C/21/00 |

* cited by examiner

Primary Examiner—Salvatore Cangialosi
(74) Attorney, Agent, or Firm—Harrington & Smith, LLP; Milan Patel

(57) ABSTRACT

A method operates a mobile communication terminal or MCT (10) by the steps of: (A) determining, at the MCT 10, a location of the MCT in accordance with Global Positioning System (GPS) inputs, (B) transmitting a signal that indicates the GPS-determined location, the signal being transmitted from the MCT to a network service provider or NSP (30), and (C) downloading data to the MCT 10 from the network service provider 34 or from a server (40, 42) that is coupled to the network service provider through a data communications network (38). The downloaded data is selected in accordance with the GPS-determined location of the MCT. The step of determining may employ a GPS capability of the MCT or a GPS capability of a GPS accessory (28) that is coupled to the MCT. In one embodiment the downloaded data is comprised of map data, while in another embodiment the downloaded data is comprised of at least one of operating software or an operating protocol. The data may be downloaded as a background task. The step of transmitting may occur periodically, or in response to a user input, or in response to a request from the network service provider.

16 Claims, 2 Drawing Sheets

DOWNLOADING OF MAPS AND LOCATION SPECIFIC CONFIGURATION INFORMATION TO GPS-CAPABLE MOBILE COMMUNICATION TERMINAL

FIELD OF THE INVENTION

This invention relates generally to mobile communication terminals, such as hand-held radiotelephones including cellular telephones and personal communicators, and more particularly is related to those mobile communication terminals having a receiver for receiving transmissions from satellites of the Global Positioning System (GPS) and a processor for determining an accurate location of the terminal based on the received GPS transmissions.

BACKGROUND OF THE INVENTION

A modern mobile communication terminal (MCT) may be constructed to contain a GPS sub-system, or to have an interface for being bidirectionally coupled to an accessory device that contains the GPS sub-system. Reference in this regard may be had to, for example, U.S. Pat. No. 5,786,789, issued Jul. 28, 1998, entitled "GPS and Cellphone Unit Having Add-on Modules" to Janky (Trimble Navigation Limited). Reference may also be had to commonly assigned and copending U.S. patent application Ser. No. 09/473,485 filed Dec. 28, 1999, entitled "Improved Electrical, Mechanical, and Logical Interface for a User Terminal GPS Accessory Module" by M. Sutherland et al. A MCT having GPS functionality may be referred to herein as being a GPS-capable MCT. One problem that can arise during the operation of a GPS-capable MCT relates to an amount of memory that is available for storing maps. The use of a map is desirable, as the map can be displayed by the MCT, or by an attached peripheral device or accessory, such as a PC, a laptop or notebook computer, or a personal organizer, whereby the user's GPS-determined location can be indicated on the map. In this manner the user is enabled to navigate through city streets, country roads, etc. However, because of limited memory capability the MCT and/or GPS accessory may not be capable of simultaneously storing a sufficient number of maps to satisfy the needs of the user. If the user is unable to store a desired number of maps in the MCT, and if the user is not able to access a source of maps to retrieve same through a wired connection to a data communications network, then the overall functionality of the GPS-capable MCT may be impaired.

Another MCT-location related problem can arise when the GPS-capable MCT enters a service area that differs from the home service area of the MCT. In this case it may be desirable for a network operator or for some other entity to provide location-specific protocols and/or software versions to the MCT. However, at the present time this need has not been satisfactorily addressed.

OBJECTS AND ADVANTAGES OF THE INVENTION

It is a first object and advantage of this invention to provide methods and apparatus for a GPS-capable MCT that overcomes the foregoing and other problems.

It is another object and advantage of this invention to provide methods and apparatus for a GPS-capable MCT to receive, on demand or in an automatic fashion, a download of a map that i descriptive of an area in which the MCT is currently located, or is predicted to be located.

It is a further object and advantage of this invention to provide methods and apparatus for a GPS-ucapable MCT to receive, on demand or in an automatic fashion, a download of location-specific software that facilitates the operation, of the MCT within an area in which the MCT is currently located, or is predicted to be located.

SUMMARY OF THE INVENTION

The forgoing and other problems are overcome and the objects of the invention are realized by methods and apparatus in accordance with embodiments of this invention.

A method in accordance with the teachings found herein operates a MCT by the steps of: (A) determining, at the MCT, a location of the MCT in accordance with Global Positioning System (GPS) inputs, (B) transmitting a signal that indicates the GPS-determined location, the signal being transmitted from the MCT to a network service provider, and (C) downloading data to the MCT from the network service provider or from a server that is coupled to the network service provider through a data communications network, the downloaded data being selected in accordance with the GPS-determined location of the MCT. The step of determining may employ a GPS capability of the MCT or a GPS capability of a GPS accessory that is coupled to the MCT. In one embodiment the downloaded data is comprised of map data, while in another embodiment the downloaded data is comprised of at least one of operating software or an operating protocol. The data may be downloaded as a background task. The step of transmitting may occur periodically, or in response to a user input, or in response to a request from the network service provider.

In accordance with a further method of this invention for operating the MCT, the user inputs to the MCT an expected future location of the MCT; the MCT transmits a signal that indicates the expected future location, the signal being transmitted from the MCT to a network service provider; and data is downloaded to the MCT from the network service provider, the downloaded data being selected in accordance with the expected future location of the MCT. As before, it may be preferable that the data is downloaded as a background task.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
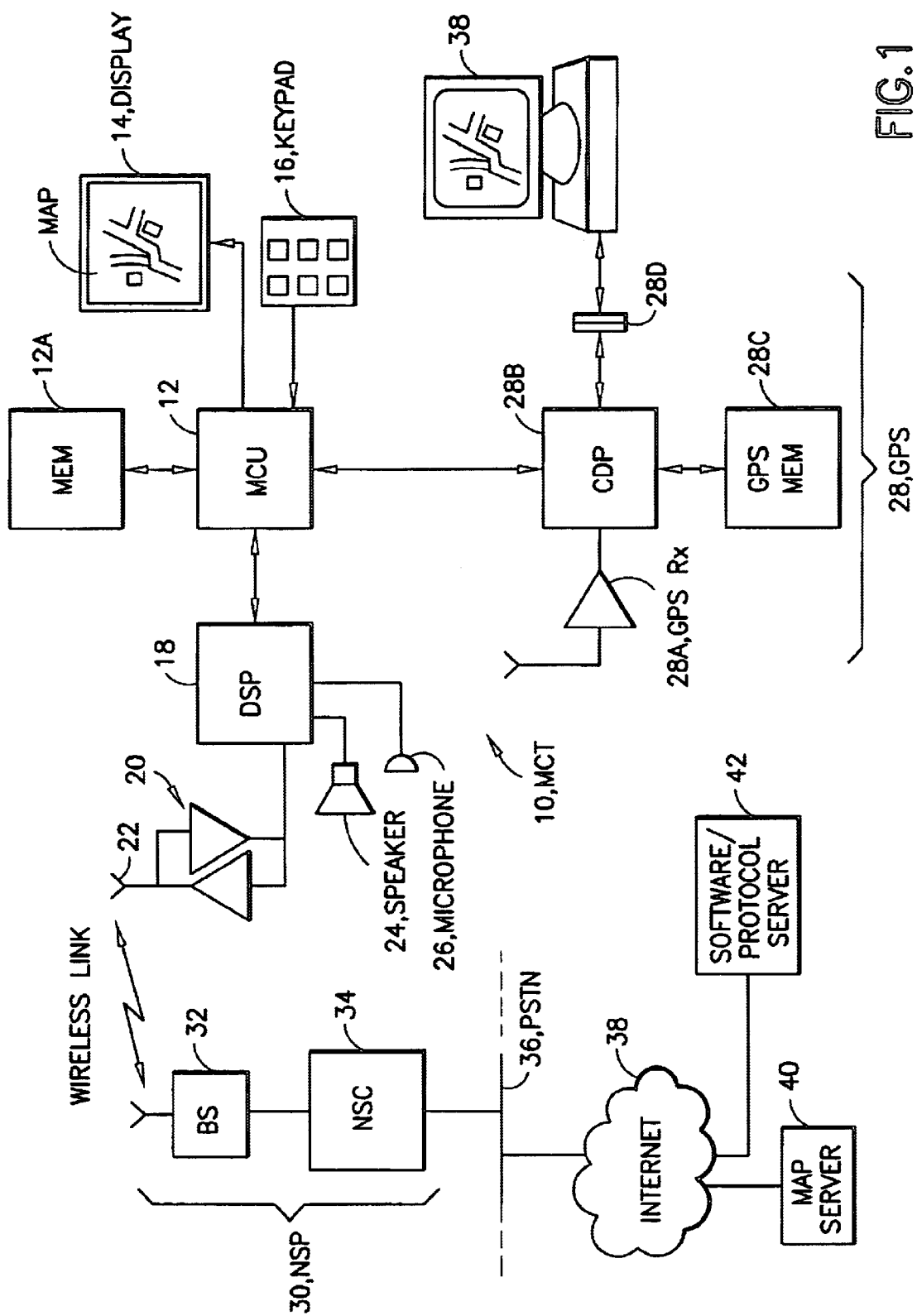
FIG. 1 is block diagram of a MCT that is constructed and operated in accordance with the teachings of this invention.

FIG. 1 is a simplified block diagram of a MCT 10 that incorporates or is coupled to a GPS accessory or sub-system 28 in accordance with an aspect of this invention. The MCT 10 contains a data processor such as a microprocessor control unit (MCU) 12 that coupled to a visual display 14, such as a LCD, and that receives input from a keypad 16. The keypad 16 may contain alphanumeric keys, soft keys, a power on/off key, etc., as is conventional in these types of devices. The combination of the MCU 12, display 14 and keypad 16 provides the user interface (UI) of the MCT 10. A memory (MEM) 12A stores an operating program for the MCU 12, as well as user entered data and other data and constants. The memory 12A is also assumed to store operating software and current network-related information, such as a Preferred Roaming List.

The MCT 10 may also include a digital signal processor (DSP) type of device 18 that implements the required baseband and audio functions. A radio frequency (RF) transceiver 20 is bidirectionally coupled to the DSP 18, as well as to at least one antenna 22. Using the transceiver 20 and antenna 22 the MCT 10 is enabled to establish bidirectional communication links with remote transceivers, and to gain access to voice and data communication networks. To this end there exists at least one network service provider (NSP) 30 operating at least one base site or station (BS) 32 coupled to a Network Service Center (NSC) 34. The NSC 34 may be coupled directly or indirectly to a telecommunications network such as the Public Switched Telephone Network (PSTN) 36.

A speaker 24 (or earphone) and a microphone 26 are typically also coupled to the DSP 18 for enabling a user to make and receive telephone voice calls.

The GPS accessory or sub-system 28 includes a GPS antenna and receiver 28A, a controlling data processor (CDP) 28B and required support circuitry, and a memory 28C for storing an operating program and data, such as satellite orbital parameters needed for acquiring transmissions from the satellites of the GPS constellation (not shown). It is assumed that memory 28C is of sufficient capacity to store at least one map, which may be provided to an external display device 38 via an interface 28D, or which may be provided to the MCU for display on the MCT display 14. It is also within the scope of this invention to store a map, or a portion of a map, in the MCU memory 12A.

In accordance with an aspect of this invention the MCU 12 is responsive to location information received from the CDP 28B for transmitting the location information to the NSC 34 via the BS 32. The location information can be transmitted periodically (e.g., every five minutes), or in response to a user input, or in response to a request from the NSC 34. The NSC 34 may compare the received location information to various maps of the local region and then transmit data representing an appropriate map to the MCT 10. An appropriate map is one that encompasses the current location of MCT 10. The map data may be transmitted as a background task, for example during a telephone call, such that the user need not be aware that a new map is being downloaded to his MCT 10. In this manner the MCT 10 need have only a sufficient memory capacity to store one map (i.e., only the map that covers the current geographical location of the MCT 10). The downloaded map can be displayed on the display 14 and/or on the external device, such as a laptop or notebook PC 38. If desired, an identification of the MCT's current location can be superimposed on the displayed map data.

It is also within the scope of this invention to enable the user to enter data that specifies a location, and to then download a map corresponding to the specified location. For example, before leaving home on a business trip the user may enter information descriptive of a latitude and a longitude of his destination, or simply a name of the destination (e.g., Dallas), which is used to select a map for the specified location. The map can then be downloaded and be stored in the user's MCT 10 for use when the user arrives at the indicated location.

The map data may be maintained by the NSC 34, or it may be provided from some other entity, such as a map server 40 that is coupled to the PSTN 36 via a global data communications network, such as the Internet 38. The download may occur as a background task, with the NSC 34 or some other entity buffering the downloaded data if required.

In accordance with a further aspect of this invention the GPS-capable MCT 10 is enabled to receive, on demand or in an automatic fashion, the download of location-specific information and/or software that facilitates the operation of the MCT 10 within a region in which the MCT is currently located, or is predicted to be located. The downloaded information may be specific to the current NSP 30 of the MCT 10, or it could be independent of the current network service provider. As was the case for the map data, the location-specific information and/or software that facilitates the operation of the MCT 10 may be maintained by the NSC 34, or it may be provided from some other entity, such as a software/protocol server 42 that is coupled to the PSTN 36 via the Internet 38. As with the map data download, the download may occur as a background task, with the NSC 34 or some other entity buffering the downloaded data if required.

In a manner similar to the case for the map data, the source of the data may compare GPS-determined location information to determine location-specific operating software, such as routines for the DSP 18 and or the MCU 12, or other information, such as operating protocols, a Preferred Roaming List, a list of numbers of local dealers or repair centers, etc., and then forwards this data to the MCT 10. As was stated above, the software/protocol data can also be transmitted to the MCT 10 as a background task such that the user need not be aware that the download is in progress.

In this manner the GPS-capable MCT 10 can be originally provided with minimal functionality, for example, enough to determine its current location, and then transmit this information to the current NSP 30. In response to receiving the location information, the NSC 34 selects an appropriate set of operating software and other information, and then downloads this data to the MCT 10 for storage in the memory 12A. After storing this software and other information, the MCT 10 becomes fully configured for operating at its current location.

While the map server 40 is shown as being a separate server from the software/protocol server 42, in some embodiments they may be one and the same server. This may be structured as a value added service for which the user is charged by the supplier of the requested downloaded data.

Figure 2:
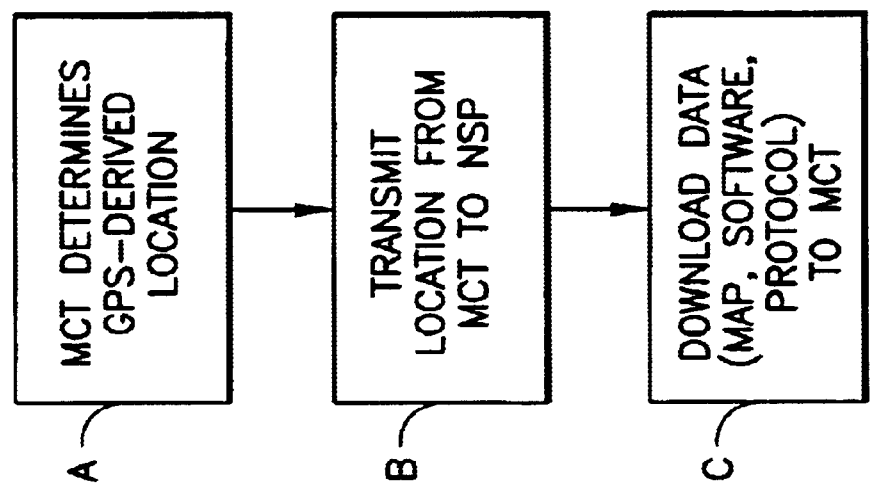
FIG. 2 is a logic flow diagram in accordance with a first method of this invention.

Based on the foregoing, and referring as well to FIG. 2, it should be appreciated that a method in accordance with these teachings operates the MCT 10 by the steps of: (A) determining, at the MCT 10, a location of the MCT in accordance with Global Positioning System (GPS) (or equivalent) inputs, (B) transmitting a signal that indicates the GPS-determined location, the signal being transmitted from the MCT 10 to the network service provider 30, and (C) downloading data to the MCT 10 from the network service provider 34 or from a server 40, 42 that is coupled to the network service provider 34 through a data communications network 38, the downloaded data being selected in accordance with the GPS-determined location of the MCT. The step of determining may employ a GPS capability of the MCT 10 or a GPS capability of the GPS accessory 28 that is coupled to the MCT 10. In one embodiment the downloaded data is comprised of map data, while in another embodiment the downloaded data is comprised of at least one of operating software or an operating protocol. The data may be downloaded as a background task.

Figure 3:
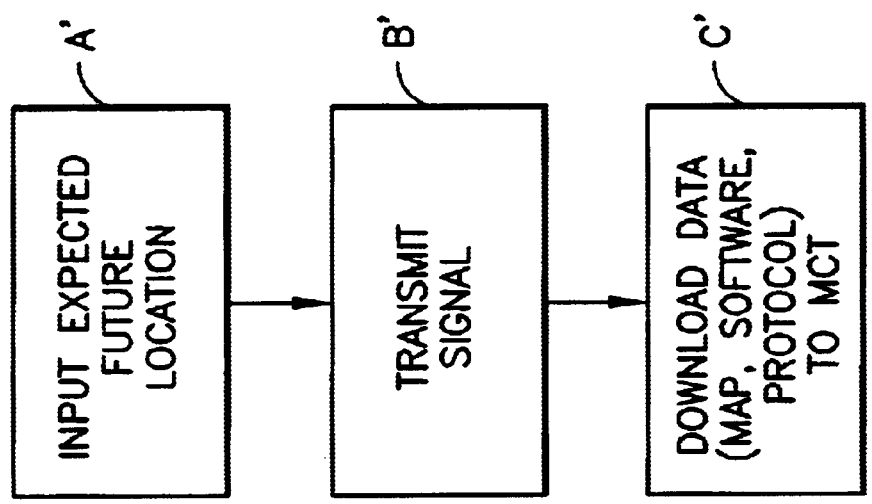
FIG. 3 is a logic flow diagram in accordance with a second method of this invention.

In accordance with a further method of this invention for operating the MCT 10, and referring to FIG. 3, at Block A' the user inputs to the MCT 10 or directly to one of the servers 40, 42 an expected future location of the MCT; at Block B' a signal may be transmitted that indicates the expected future location; and at Block C' data is downloaded to the MCT 10 from the NSP 30. The downloaded data could be one or more of map data, operating software, or an operating protocol that is selected in accordance with expected future location of the MCT 10. As before, it may be preferable that the data is downloaded as a background task.

While the invention has been particularly shown and described with respect to preferred embodiments thereof, it will be understood by those skilled in the art that changes in form and details may be made therein without departing from the scope and spirit of the invention.

What is claimed is:

1. A method for operating a mobile communication terminal (MCT), comprising steps of:
   determining, at the MCT, a location of the MCT in accordance with Global Positioning System (OPS) inputs;
   transmitting a signal, periodically either automatically, manually, or upon request from a network service provider, that indicates the GPS-determined location, the signal being transmitted from the MCT to the network service provider; and
   downloading data as a background task to the MCT from the network service provider, the downloaded data being selected in accordance with the GPS-determined location of the MCT.

2. A method as in claim 1, wherein the step of determining employs a GPS capability of the MCT.

3. A method as in claim 1, wherein the step of determining employs a GPS capability of a GPS accessory that is coupled to the MCT.

4. A method as in claim 1, wherein the downloaded data is comprised of at least one of map data, operating software or an operating protocol.

5. A method for operating a mobile communication terminal (MCT), comprising steps of:
   determining, at the MCT, a location of the MCT in accordance with Global Positioning System (GPS) inputs;
   transmitting a signal, periodically either automatically manually, or upon request from a network service provider, that indicates the GPS-determined location, the signal being transmitted from the MCT to the network service provider; and
   downloading data as a background task to the MCT from a server coupled to a global data communication network that is coupled to the network service provider, the downloaded data being selected in accordance with the GPS-determined location of the MCT.

6. A method as in claim 5, wherein the step of determining employs a GPS capability of the MCT.

7. A method as in claim 5, wherein the step of determining employs a GPS capability of a GPS accessory that is coupled to the MCT.

8. A method as in claim 5, wherein the downloaded data is comprised of map data.

9. A method as in claim 5, wherein the downloaded data is comprised of at least one of operating software or an operating protocol.

10. A wireless telecommunications system comprising a mobile communication terminal (MCT) and a network service provider (NSP), said MCT operating to; determine its location in accordance with Global Positioning System (GPS) inputs and comprising a transmitter for transmitting a signal that indicates the GPS-determined location, the signal being transmitted from said MCT to said NSP periodically either automatically, manually, or upon request from said NSP, said MCT further comprising a receiver for receiving a download of data from said NSP as a background task, the downloaded data being selected in accordance with the GPS-determined location of said MCT.

11. A system as in claim 10, wherein said MCT employs a GPS capability of said MCT to determine its location.

12. A system as in claim 10, wherein said MCT employs a GPS capability of a GPS accessory that is coupled to said MCT to determine its location.

13. A system as in claim 10, wherein the downloaded data is comprised of map data.

14. A system as in claim 10, wherein the downloaded data is comprised of operating software.

15. A system as in claim 10, wherein the downloaded data is comprised of an operating protocol.

16. A method for operating a mobile communication terminal (MCT), comprising steps of:
   inputting an expected future location of the MCT;
   transmitting a signal that indicates the expected future location; and
   downloading as a background task at least one of operating software or operating protocol to the MCT from a network service provider, the downloaded data being selected in accordance with the expected future location of the MCT.

* * * * *